United States Patent
Akkala et al.

(10) Patent No.: US 10,623,640 B2
(45) Date of Patent: Apr. 14, 2020

(54) METHOD AND SYSTEM FOR DETECTION OF CONTAMINANTS PRESENT ON A LENS OF AN IMAGING DEVICE

(71) Applicant: Uurmi Systems Pvt Ltd, Telangana (IN)

(72) Inventors: Vivek Akkala, Telangana (IN); Parth Nayankumar Parikh, Telangana (IN); Mahesh Kumar B S, Telangana (IN); Ajinkya S. Deshmukh, Telangana (IN); Swarup S. Medasani, Telangana (IN)

(*) Notice: Subject to any disclaimer, the term of this patent is extended or adjusted under 35 U.S.C. 154(b) by 0 days.

(21) Appl. No.: 15/462,505

(22) Filed: Mar. 17, 2017

(65) Prior Publication Data
US 2018/0270422 A1   Sep. 20, 2018

(51) Int. Cl.
*H04N 5/225* (2006.01)
*G02B 13/16* (2006.01)
*H04N 5/232* (2006.01)

(52) U.S. Cl.
CPC ....... *H04N 5/23248* (2013.01); *H04N 5/2254* (2013.01); *H04N 5/23229* (2013.01)

(58) Field of Classification Search
CPC ............. H04N 5/23248; H04N 5/2254; H04N 5/23229; H04N 5/217; H04N 5/2256; G06K 9/6202; G06T 7/42
USPC .................................. 348/335, 241; 250/573
See application file for complete search history.

(56) References Cited

U.S. PATENT DOCUMENTS

| | | | | |
|---|---|---|---|---|
| 5,923,027 A | * | 7/1999 | Stam ..................... | B60S 1/0822 250/208.1 |
| 6,555,804 B1 | * | 4/2003 | Blasing ................ | B60S 1/0822 250/208.1 |
| 2006/0115121 A1 | | 6/2006 | Saka et al. | |
| 2007/0272884 A1 | * | 11/2007 | Utida .................... | B60S 1/0822 250/573 |
| 2013/0300869 A1 | | 11/2013 | Lu et al. | |

(Continued)

FOREIGN PATENT DOCUMENTS

| | | |
|---|---|---|
| DE | 10322087 A1 | 12/2004 |
| JP | 2006254206 A | 9/2006 |
| JP | 2009130700 A * | 6/2009 |

(Continued)

*Primary Examiner* — Sinh Tran
*Assistant Examiner* — Zhenzhen Wu
(74) *Attorney, Agent, or Firm* — Next IP Law Group

(57) ABSTRACT

A method and system for detection of contaminants present on a lens of an imaging device is disclosed. An input image received from an imaging device is split into a plurality of patches of predefined size and a kurtosis value calculated for each and compared with a median kurtosis value. Patches having kurtosis value less than the median kurtosis value are selected. Based on comparison of a first maximum likelihood of the selected patches with a predefined threshold, one or more selected patches are stored. Such patches are split into a top and a bottom portion for processing based on discrete wavelet transform and singular value decomposition, respectively. The top and the bottom portion are merged patches for which a second maximum likelihood is greater than a second predefined threshold, are stored. Further, contaminants in the image are classified into predefined categories based on one or more image features.

20 Claims, 9 Drawing Sheets

(56) References Cited

U.S. PATENT DOCUMENTS

2014/0232869 A1  8/2014  May et al.

FOREIGN PATENT DOCUMENTS

| JP | 2015070566 A | * | 4/2015 | ............... H04N 5/21 |
| WO | 2010038223 A1 | | 4/2010 | |
| WO | 2015011998 A1 | | 1/2015 | |

* cited by examiner

METHOD AND SYSTEM FOR DETECTION OF CONTAMINANTS PRESENT ON A LENS OF AN IMAGING DEVICE

FIELD OF THE DISCLOSURE

The present disclosure is generally related to detection of contaminants and more particularly to detection of contaminants on a lens of an imaging device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Advancements in the field of image processing have led to development of various algorithms for detection and monitoring of one or more objects in the field-of-view of a camera. Such systems may be deployed in collision avoidance systems, security cameras, sensor dirt detection, environment pollution analysis, and the like. In certain scenarios, one or more contaminants such as dirt, water, droplets, mud, leaves, oil deposits, smudge, and the like may be present on the lens of the imaging device. This may lead to degradation of the performance of the image by blurring of the output image, false detections in the output image, and the like. Such degradation in performance can prove to be fatal in cases the image processing is being performed for sensitive applications, such as a collision avoidance system.

Various techniques have been developed to detect the contaminants present on the imaging device. In accordance with one of the current techniques, the detection of the contaminant is based on a contrast difference and an inter-frame difference of the one or more image frames captured by the imaging device. The technique fails to differentiate between various types of contaminants. In accordance with another technique, a plurality of imaging devices is used for detection of the contaminants that increases the hardware requirement and complexity. In accordance with another technique, difference image is used to detect a raindrop that is transparent in nature. The technique, however, does not consider the background information that is transmitted through the raindrop. Therefore, the technique is not preferred for detection of transparent contaminants whose luminance depends on the background information. In accordance with another technique, the captured image is considered to be a composite wave, wherein the presence of the contaminant changes the property of composite wave. An image frequency power is used for the detection of the change in the property of the composite wave. In accordance with another technique, a difference of frames between input frames is determined for detection of dark and bright spots. Further, a temporal analysis is performed on the one or more frames to detect the contaminants.

The existing techniques for contaminant detection typically require a large number of image frames to accurately detect the contaminant and are slow and computationally expensive. Therefore, there is a need for a technique that minimises the computation required for accurately detecting contaminant present on the lens of the imaging device.

Further, it is desirable that the computation for detection of contaminant is performed in real-time. Additionally, it may be required to reduce the hardware required for implementing such a process so as to make the system deployable across mobile platforms.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a method for detection of contaminants present on a lens of an imaging device is provided. The method may comprise splitting an input image received from the imaging device into a plurality of patches of a predefined size. The method may further comprise calculating a kurtosis value for each of the plurality of patches. The method may further comprise determining a kurtosis based threshold value for the input image. The determined kurtosis value corresponds to a median of the kurtosis values calculated for each of the plurality of patches. The method may further comprise selecting one or more patches of the input image having corresponding kurtosis value less than the kurtosis based threshold value based on patch indices associated with each of the one or more patches.

The method further comprises determining a first maximum likelihood for each of the one or more selected patches. The first maximum likelihood is based on a maximum likelihood criterion. The method further comprises storing patch indices corresponding to the selected one or more patches for which the determined first maximum likelihood is greater than a first predefined threshold. The determined first maximum likelihood may be based on the kurtosis values of the selected one or more patches.

The method may further comprise splitting the one or more selected patches having the first maximum likelihood greater than the first predefined threshold in a top portion and a bottom portion. The top portion may be processed based on a discrete wavelet transform and the bottom portion is processed based on singular value decomposition. The method may further comprise determining wavelet energy metric based on a cumulative log energy associated with sub-bands of the top portion of the plurality of patches. The method may further comprise determining singular value decomposition metric based on a sum of singular values corresponding to the bottom portion of the plurality of patches. The method may further comprise merging the top portion and the bottom portion based on the determined wavelet energy metric and the determined singular value decomposition metric.

The method may further comprise determining the second maximum likelihood corresponding to the merged top portion and the bottom portion. The method may further comprise storing the one or more patches for which the determined second maximum likelihood is greater than second predefined threshold. The determined second maximum likelihood corresponds to the top portion and the bottom portion. The method may further comprise classifying a contaminant into one or more predefined categories based on one or more image features.

In an example embodiment, a system for detection of contaminants present on a lens of an imaging device is provided. The system may comprise one or more processors configured to split an input image received from the imaging device into a plurality of patches of a predefined size. The one or more processors may be further configured to calculate a kurtosis value for each of the plurality of patches. The one or more processors may be further configured to determine a kurtosis based threshold value for the input image. The determined kurtosis based threshold value corresponds to a median of the kurtosis values calculated for each of the plurality of patches. The one or more processors may be further configured to select one or more patches of the input image having corresponding kurtosis value less than the kurtosis based threshold value based on patch indices associated with each of the one or more patches.

The system may comprise one or more processors configured to determine a first maximum likelihood for each of the one or more selected patches. The first maximum likelihood is based on a maximum likelihood criterion. The system may comprise one or more processors configured to store patch indices corresponding to the selected one or more patches for which the determined first maximum likelihood is greater than a first predefined threshold. The determined first maximum likelihood may be based on the kurtosis values of the selected one or more patches.

The system may comprise one or more processors configured to split the one or more selected patches having the first maximum likelihood greater than the first predefined threshold in a top portion and a bottom portion. The top portion may be processed based on discrete wavelet transform and the bottom portion is processed based on singular value decomposition. The system may comprise one or more processors configured to determine wavelet energy metric based on a cumulative log energy associated with sub-bands of the top portion of the plurality of patches. The system may comprise one or more processors configured to determine singular value decomposition metric based on a sum of singular values corresponding to the bottom portion of the plurality of patches. The system may comprise one or more processors configured to merge the top portion and the bottom portion based on the determined wavelet energy metric and the determined singular value decomposition metric.

The system may comprise one or more processors configured to determine the second maximum likelihood corresponding to the merged top portion and the bottom portion. The system may comprise one or more processors configured to store the one or more patches for which the determined second maximum likelihood is greater than second predefined threshold. The determined second maximum likelihood corresponds to the top portion and the bottom portion. The system may comprise one or more processors configured to classify a contaminant into one or more predefined categories based on one or more image features.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully herein after with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
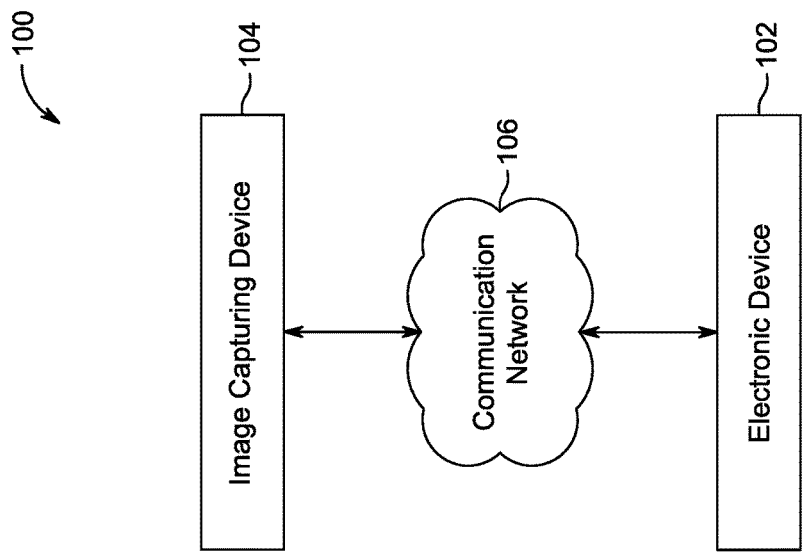
FIG. 1 illustrates a network environment for implementation of the disclosed method and system for detection of contaminants present on a lens of an imaging device, in accordance with an embodiment.

FIG. 1 illustrates a network environment for implementation of the disclosed method and system for detection of contaminants present on a lens of an imaging device, in accordance with an embodiment. The network environment 100 comprises an electronic device 102 that may be communicatively connected to an image capturing device 104.

In an implementation, the image capturing device 104 may correspond to a camera mounted on a vehicle. The image capturing device 104 may further correspond to a fish-eye lens, a wide lens, or an ultra-wide lens. Further, the electronic device 102 may correspond to an in-vehicle system that may be configured to receive the images captured by the image capturing device 104. The connection between the electronic device 102 and the imaging device 104 may be based on a communication network 106. The images captured by the image capturing device 104 may be communicated to the electronic device 102, via the communication network 106. A person of ordinary skill in the art will appreciate that in an example embodiment, the imaging capturing device 104 may be integrated with the electronic device 102.

In operation, the image feed captured by the image capturing device 104 may comprise one or more image. The one or more images may comprise a plurality of frames that may be captured by the image capturing device 104. In an aspect, the image capturing device 104 may transmit the captured one or more images to the electronic device 102, via the communication network 106. In an aspect, the electronic device 104 may pre-process the captured image based on one or more algorithms stored in a memory associated with the electronic device 102, in case the images are captured in a low-light condition. In an aspect, the electronic device 104 may further perform one or more corrections to the captured image based on or more algorithms stored in the memory associated with the electronic device 102.

The electronic device 102 may split the received frames of the one or more images into a plurality of patches. In an aspect, the splitting of the one or more frames into the plurality of patches is based on a true detection analysis. The true detection analysis is based on a correlation between the number of patches into which the input image is divided and the number of true detections.

In an aspect, the electronic device 102 may calculate a kurtosis value for each of the plurality of patches. The electronic device 102 may further determine a kurtosis based threshold value corresponding to a frame based on the calculated kurtosis value for each of the plurality of patches. The determined median kurtosis value corresponds to the kurtosis values calculated for each of the plurality of patches. The electronic device 102 may further compare the calculated kurtosis values of each of the plurality of patches with the determined kurtosis based threshold value. Based on the comparison, the electronic device 102 may select one or more patches of the input image having kurtosis value less than the kurtosis based threshold value. The selection of the one or more patches may be based on patch indices associated with each of the one or more patches of the plurality of patches.

The electronic device 102 may determine a first maximum likelihood for each of the one or more selected patches. The determination of the first maximum likelihood may be based on a first maximum likelihood criterion. In an aspect, the maximum likelihood criterion is based on a total number of analyzed frames of the input feed corresponding to the one or more images captured by the imaging device 104, an outlier rejection function, a consistency value, and a likelihood factor. The electronic device 102 may store patch indices corresponding to the one or more selected patches for which the determined first maximum likelihood is greater than a first predefined threshold. The determined first maximum likelihood may be based on the kurtosis values of the selected one or more patches.

The electronic device 102 may split one or more selected patches into a top portion and a bottom portion. Such one or more selected patches may correspond to patches having the first maximum likelihood greater than the first predefined threshold. In an aspect, the electronic device 102 may process the top portion based on a discrete wavelet transform (DWT) and the bottom portion based on singular value decomposition (SVD). The electronic device 102 may determine wavelet energy metric based on a cumulative log energy associated with sub-bands of the top portion of the plurality of patches. The electronic device 102 may further determine singular value decomposition metric based on a sum of singular values corresponding to the bottom portion of the plurality of patches. In an aspect, the sum of the singular values may be determined based on a set of column vectors associated with a plurality of orthogonal matrices and a diagonal matrix, and a total number of weights. Further, the electronic device 102 may determine the plurality of orthogonal matrices and the diagonal matrix based on a singular value decomposition process performed on the bottom portion of the plurality of patches.

The electronic device 102 may merge the top portion and the bottom portion based on the determined wavelet energy metric and the determined singular value decomposition metric. The electronic device 102 may further determine a second maximum likelihood corresponding to the merged top portion and the bottom portions of the frames. The electronic device 102 may further store the one or more patches for which the determined second maximum likelihood is greater than second predefined threshold. The determined second maximum likelihood corresponds to the top portion and the bottom portion. The electronic device 102 may further perform a temporal consistency feature analysis on the stored one or more patches comprising merged top portion and the bottom portion.

In an aspect, the consistency feature analysis may comprise determination of at least a number of frames for which the one or more image features are consistent over a predefined number of frames on which the consistency feature analysis. The electronic device 102 may classify a contaminant into one or more predefined categories based on one or more image features. In an example embodiment, the predefined categories may correspond to at least a transparent contaminant, an opaque contaminant, and/or a translucent contaminant.

Figure 2:
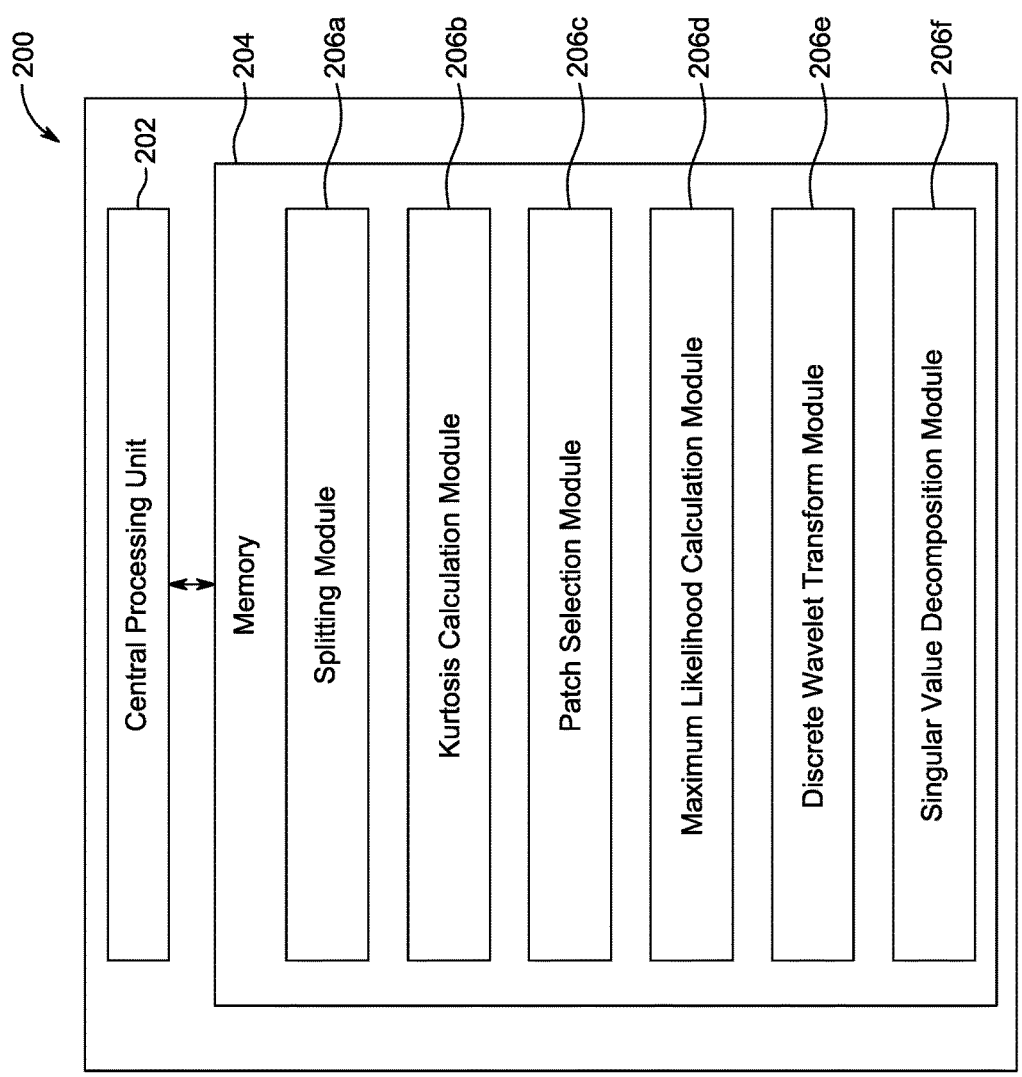
FIG. 2 illustrates a block diagram of a system for detection of contaminants present on a lens of an imaging device, in accordance with an embodiment.
Figure 3A:
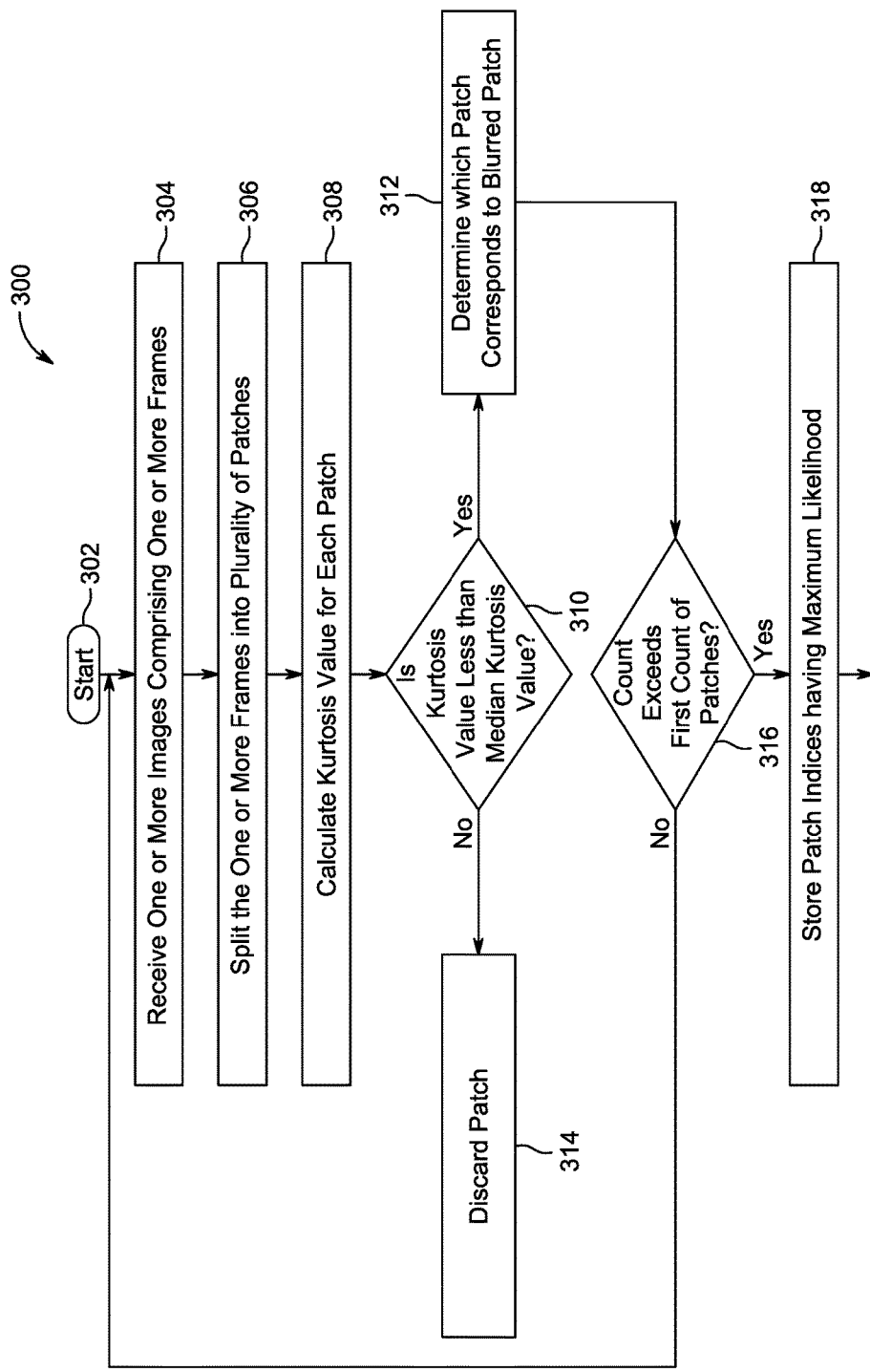
FIGS. 3A to 3D collectively illustrate a flow diagram for detection of contaminants present on a lens of an imaging device, in accordance with an embodiment.
Figure 3B:
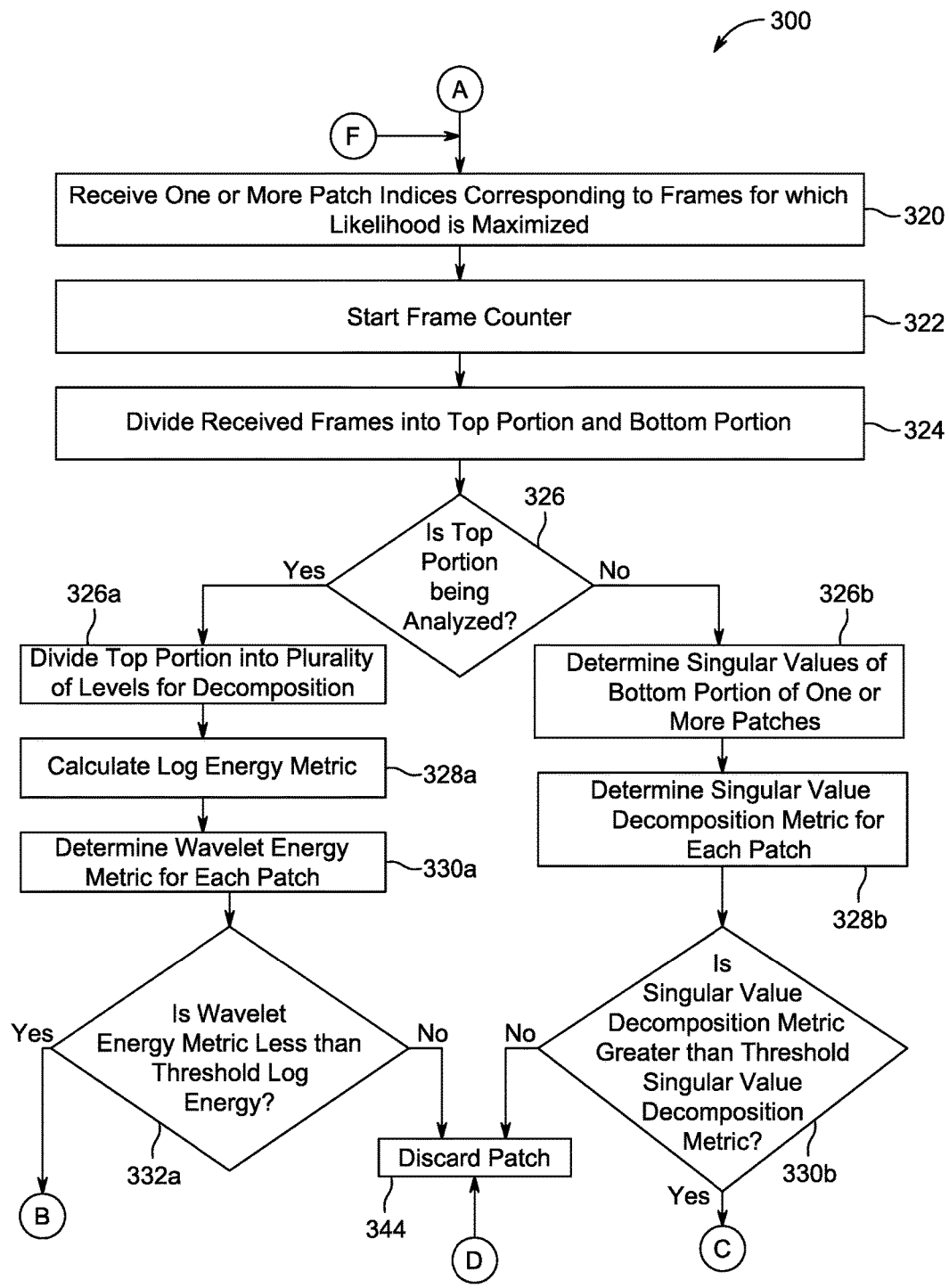
Figure 3C:
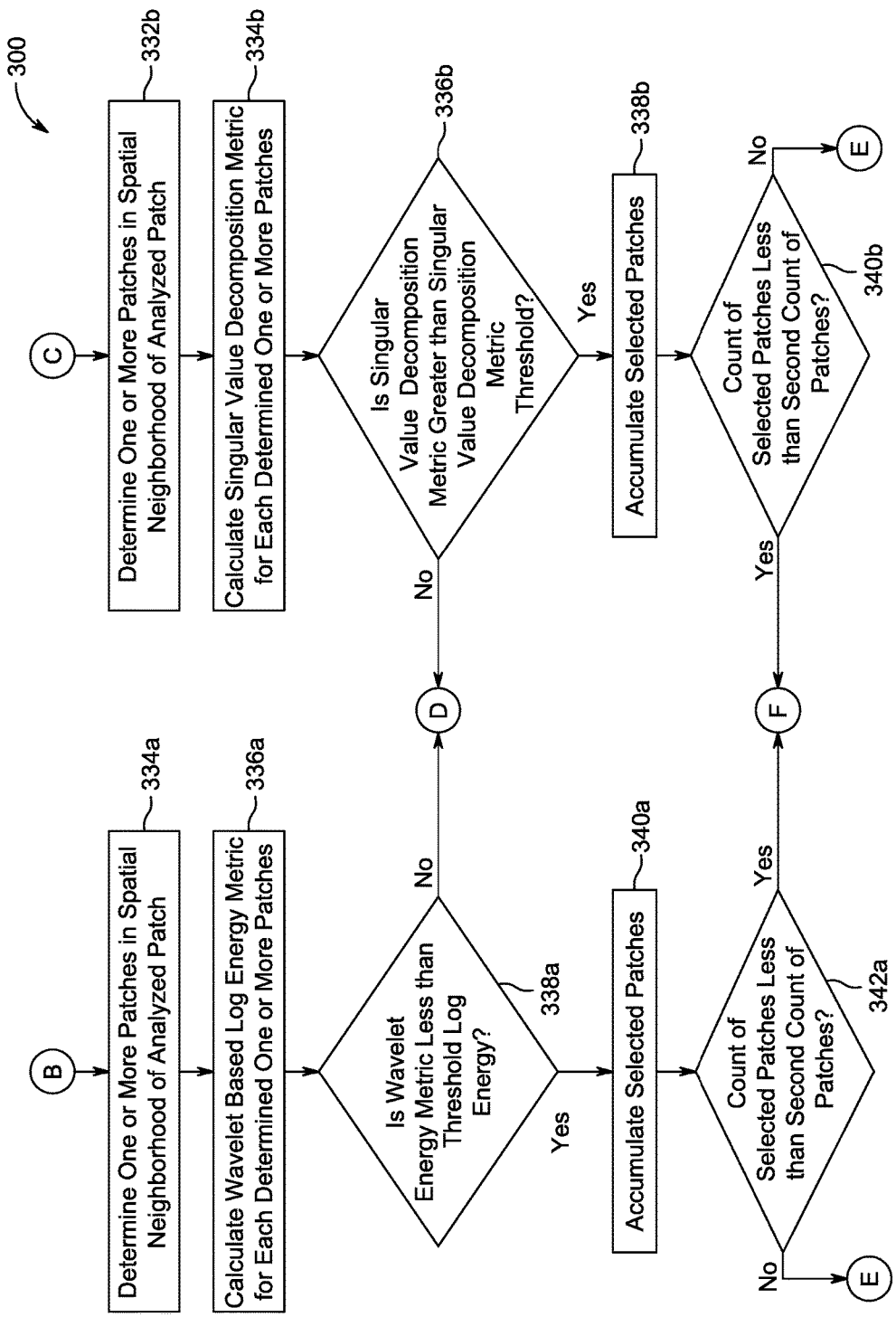
Figure 3D:
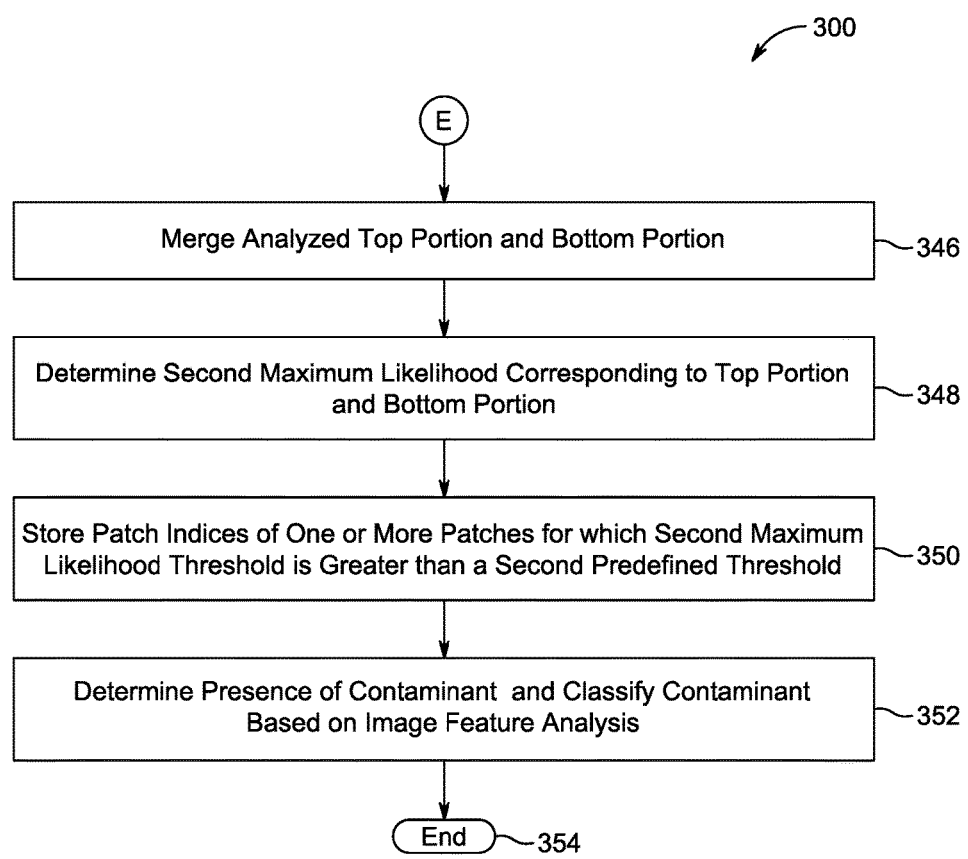

FIG. 2 illustrates a block diagram of a system for detection of contaminants present on a lens of an imaging device, in accordance with an embodiment. With reference to the diagram 200, there are shown one or more units of the electronic device 102. FIG. 2 is explained in conjunction with the elements disclosed in FIG. 1. In an implementation, the electronic device 102 may correspond to a laptop, desktop, smartphone, or any other apparatus having at least a central processing unit (CPU) 202 and a memory means 204. The one or more images received from the image capturing device 104 may be stored in a memory 204 of the electronic device 102 and no external source may be required.

The CPU 202 executes computer program instructions stored in the memory 204. The CPU 202 may also be configured to decode and execute any instructions received from the external sources through the communication network 106. The CPU 202 may also execute one or more client applications. The CPU 202 may include one or more general purpose processors (e.g., INTEL microprocessors) and/or one or more special purpose processors (e.g., digital signal processors). The CPU 202 may be configured to execute computer-readable program instructions, such as program instructions to carry out any of the functions described in this description.

The memory 204 includes a computer readable medium including volatile and/or non-volatile storage components, such as optical, magnetic, organic or other memory or disc storage, which may be integrated in whole or in part with a processor, such as CPU 202. Alternatively, the memory may be remotely located and coupled to the CPU 202 by connection mechanism and/or network cable. The memory 204 is enabled to store various types of data. For instance, the memory 204 may store one or more identifiers related to the electronic device 102 and computer-readable program instructions executable by the CPU 202. In an aspect, the memory 204 may store the video that needs to be analyzed. The memory 204 also includes one or more programming modules that comprise one or more instructions executable by the CPU 202. The memory 204 may comprise one or more modules, such as splitting module 206a, kurtosis calculation module 206b, patch selection module 206c, maximum likelihood calculation module 206d, discrete wavelet transform (DWT) module 206e, and singular value decomposition (SVD) module 206f.

A person of ordinary skill in the art will appreciate that each of the modules of the diagram 200 may comprise one or more instruction sets that may be stored in the memory 204 associated with the electronic device 102. The foregoing one or more stored modules may be controlled by a central processing unit 202 to perform the steps to implement the method to detect and classify a contaminant.

In operation, the one or more images comprising a plurality of frames may be captured by the image capturing device 104. In an aspect, the CPU 202 of the electronic device 102 may be configured to receive the captured one or more images, via the communication network 106. In an aspect, the CPU 202 may pre-process the captured image based on one or more algorithms stored in a memory 204, in case the images are captured in a low-light condition. In an aspect, the CPU 202 may further perform one or more corrections to the captured image based on or more algorithms stored in the memory 204.

The CPU 202 may be configured to execute the one or more instructions of the splitting module 206a to split the received frames of the one or more images into a plurality of patches. In an aspect, the splitting of the one or more frames into the plurality of patches is based on a true detection analysis. Further, the true detection analysis is performed such that the size of the plurality of patches is optimized for contaminant detection. Based on such an optimization it is ensured that the size of the split patches is not large because of which the contaminants that are small in size are not detectable. Further, it is ensured that the size of the split patches is not small because of which the homogeneous parts of contaminants are not detectable. Consequently, the true detection analysis is based on a correlation between the number of patches into which the input image is divided and the number of true detections corresponding to such a division.

In an aspect, the CPU 202 may be configured to execute the instructions of the kurtosis calculation module 206b to calculate a kurtosis value for each of the plurality of patches. The CPU 202 may be further configured to execute the instructions of the kurtosis calculation module 206b to determine a kurtosis based threshold value corresponding to a frame. Such a kurtosis based threshold value is based on the calculated kurtosis value for each of the plurality of patches. The CPU 202 may be further configured to execute the instructions of the kurtosis calculation module 206b to determine a median kurtosis value based on the determined kurtosis based threshold value. The CPU 202 may be configured to compare the calculated kurtosis values of each of the plurality of patches with the determined median kurtosis value. Based on the comparison, the CPU 202 may be configured to select one or more patches of the input image having kurtosis value less than the median kurtosis value. Such a selection is based on execution of one or more instructions of the patch selection module 206c by the CPU 202.

The CPU 202 may be configured to determine a first maximum likelihood for each of the one or more selected patches. The determination of the first maximum likelihood may be based on a first maximum likelihood criterion that may be stored in the memory 204. Further, the determination of the first maximum likelihood may be based on execution of one or more instructions of the maximum likelihood calculation module 206d.

In an aspect, the maximum likelihood criterion is based on a total number of analyzed frames of the input feed corresponding to the one or more images captured by the image capturing device 104, an outlier rejection function, a consistency value, and a likelihood factor. The CPU 202 may be configured to store the one or more selected patches for which the determined first maximum likelihood is greater than a first predefined threshold. Such selected one or more patches may be stored in the memory 204. Further, the determination of the first maximum likelihood may be based on the kurtosis values of the selected one or more patches.

The CPU 202 may be configured to split one or more selected patches into a top portion and a bottom portion of an image by execution of one or more instructions of the splitting module 206a. Such one or more selected patches may correspond to patches having the first maximum likelihood greater than the first predefined threshold. In an aspect, the CPU 202 may be configured to process the top portion of the split patches based on execution of one or more instruction of the discrete wavelet transform (DWT) module 206e. Similarly, the CPU 202 may be configured to process the bottom portion of the split patches based on execution of one or more instructions of the singular value decomposition (SVD) module 206f.

The CPU 202 may be configured to determine wavelet energy metric based on a cumulative log energy associated with sub-bands of the top portion of the plurality of patches. The wavelet energy metric may be determined based on execution of one or more instructions of the DWT module 206e. The CPU 202 may be further configured to determine singular value decomposition metric based on a sum of singular values corresponding to the bottom portion of the plurality of patches. The singular value decomposition metric may be determined based on execution of one or more instructions of the SVD module 206f.

In an aspect, the CPU 202 may be configured to determine the sum of the singular values based on a set of column vectors associated with a plurality of orthogonal matrices and a diagonal matrix, and a total number of weights. Further, the CPU 202 may be configured to determine the plurality of orthogonal matrices and the diagonal matrix based on a singular value decomposition process performed on the bottom portion of the plurality of patches.

The CPU 202 may be further configured to merge the top portion and the bottom portion based on the determined wavelet energy metric and the determined singular value decomposition metric. The CPU 202 may be further configured to determine a second maximum likelihood corresponding to the merged top portion and the bottom portions of the frames. The second maximum likelihood may be determined based on execution of one or more instructions of the maximum likelihood calculation module 206d. The CPU 202 may be further configured to store the one or more patches for which the determined second maximum likelihood is greater than second predefined threshold. Such one or more patches may be stored in the memory 204.

The determined second maximum likelihood corresponds to the merged top portion and the bottom portion. The CPU 202 may be further configured to perform a temporal consistency feature analysis on the stored one or more patches comprising merged top portion and the bottom portion. In an aspect, the consistency feature analysis may comprise determination of at least a number of frames for which the one or more image features are consistent over a predefined number of frames on which the temporal consistency feature analysis is performed. The CPU 202 may be configured to classify a contaminant into one or more predefined categories based on one or more image features. In an example embodiment, the one or more image features correspond to at least a saturation index, a variance of the one or more patches of the image, and/or singular value decomposition metric. In an example embodiment, the predefined categories may correspond to at least a transparent contaminant, an opaque contaminant, and/or a translucent contaminant. Further, in the aforementioned embodiment the predefined number of frames corresponding to the opaque contaminant is greater than the predefined number of frames corresponding to the translucent contaminant, and the predefined number of frames corresponding to the translucent contaminant is greater than the predefined number of frames corresponding to the transparent contaminant.

FIGS. 3A to 3D collectively illustrate a flow diagram for detection of contaminants present on a lens of an imaging device, in accordance with an embodiment. The flowchart 300 of FIGS. 3A to 3D is explained in conjunction with the elements disclosed in FIGS. 1 and 2.

The flowchart 300 starts at step 302 and proceeds to step 304. At step 304, the one or more images captured by the image capturing device 104 may be received by the CPU 202 of the electronic device 102. The received one or more images may comprise a plurality of frames. In an example embodiment, the received one or more images may correspond to a view captured by a camera mounted on a moving vehicle. In an exemplary scenario, the view of the image capturing device 104 may be obstructed by one or more contaminants that may be present on the aperture of the lens of the image capturing device 104. In an example embodiment, the one or more contaminants may correspond to predefined categories such as a transparent contaminant, an opaque contaminant, and/or a translucent contaminant.

At step 306, the received one or more frames may be split into a plurality of non-overlapping patches based on execution of one or more instructions of the splitting module 206a. In an aspect, the splitting of the one or more frames into the plurality of patches is based on a true detection analysis. The graphical depiction of the true detection analysis is presented in FIG. 4. In accordance with the true detection analysis, an image of size "M×N" is split into the plurality of patches of a predefined size, such as "M/16×N/30", where "M" and "N" correspond to the number of rows and columns, respectively. For each of the predefined sizes a graph 400 may be plotted between the size of the patch 402a, and the average true detection percentage 402b. Based on the plotting of the graph, a curve 404 may be obtained depicting the variation of the average true detection percentage with the size of the patch. Further, based on the graph, an optimum size of the patch into which the one or more frames are split, is determined. Such an optimization is performed to ensure that the size of the split patches is not large because of which the contaminants that are small in size are not detectable. Similarly, it is ensured that the size of the split patches is not small because of which the homogeneous parts of contaminants are not detectable.

At step 308, a kurtosis value may be calculated by the CPU 202 for each of the split patch, based on the execution of one or more instructions of the kurtosis calculation module 206b. Further, the kurtosis based threshold value may be calculated by a linear combination of the kurtosis values of the individual pixels of a blurred patch. This is calculated in accordance with the equation (1):

$$K(B_p) = \Sigma K(B(i,j)) \quad (1)$$

where, "$K(B_p)$" is the summation of the kurtosis of pixels of a blurred patch "$B_p$", and "i" and "j" are indices of the pixels such that "i≤M" and "j≤N".

A kurtosis based threshold value corresponding to a frame may be determined by the CPU 202, based on the calculated kurtosis value for each of the plurality of patches. A median kurtosis value based on the determined kurtosis based threshold value may be determined by the CPU 202. At step 310, it may be determined whether the calculated kurtosis values of each of the plurality of patches are less than the determined median kurtosis value. In instances, when a calculated kurtosis value of a patch is less than or equal to the determined median kurtosis value, the control passes to step 312. In instances, when a calculated kurtosis value of a patch is greater than the determined median kurtosis value, the control passes to step 314. At step 314, the patch is discarded. The aforementioned comparison step is performed in accordance with the equation (2):

$$K(p) \leq \text{median}(K(p_i)) \quad (2)$$

where, "$K(p)$" corresponds to kurtosis of a patch, "$p_i$" corresponds to a pixel having index "i". Based on the aforementioned comparison, only the blurred patches are retained and the outlier patches that correspond to non-blurred patches are rejected. This is because the kurtosis of the blurred patches is less than the kurtosis of the non-blurred patches, in accordance with the equation (3) and (4):

$$K(B(i,j)) = \frac{\sum k(l,m)^4}{\left(\sum k(l,m)^2\right)^2} K(I(i,j)) \quad (3)$$

$$K(B(i,j)) \leq K(I(i,j)) \quad (4)$$

where, "$K(B(i,j))$" and "$K(I(i,j))$" correspond to kurtosis of the blurred pixel and the non-blurred pixel, respectively, and "$\Sigma k(l, m)$" corresponds to a point spread function (PSF) in accordance with the equation (5):

$$\Sigma k(l,m) \leq 1 \quad (5)$$

The aforementioned step 310 may be performed based on execution of one or more instructions of the patch selection module 206c by the CPU 202. A person of ordinary skill in the art will appreciate that the aforementioned steps may be performed by one or more other modules stored in the memory 204.

At step 312, based on the comparison, it may be determined, by the electronic device 102, which patch corresponds to a blurred patch. Based on the determination, the patch indices corresponding to the blurred patches may be extracted by the CPU 202. At step 316, it may be determined by the electronic device 102 whether the count of patches that correspond to the blurred patch exceeds a first count of patches. In an example embodiment, the first count of patches may be denoted by "S", and may correspond to a numerical value such as "60". Further, the first count of patches "S" corresponds to the first maximum likelihood criteria recited in the equation (6) disclosed below. In instances, when the count of patches that correspond to the blurred patch exceeds the first count of patches, the control passes to the step 318. In instances, when the count of patches that correspond to the blurred patch is less than the first count of patches, the control passes to the step 304. In an aspect, the count for all patches is re-initialized to zero for every set of S frames.

At step 318, the extracted patch indices for which the likelihood is maximized may be stored in the memory 204. The maximum likelihood may be determined for the patches whose patch index has been stored, based on the execution of one or more instructions of the maximum likelihood calculation module 206d. Further, a first maximum likelihood may be determined for each of the selected patches. The determination of the first maximum likelihood is in accordance with the equation (6):

$$\sum_{i=1}^{n} f(\theta \mid s_1, s_2, s_3, \ldots s_i) \geq (S) * \varphi \quad (6)$$

where, "$s_i$" corresponds to a total number of analyzed frames of the input image, "f()" corresponds to an outlier rejection function, "θ" corresponds to a consistency value, and "φ" corresponds to a likelihood factor. The abovementioned maximum likelihood is indicative of the number of time a confidence of "1" is achieved for a blurred patch.

At step 320, the extracted patch indices for which the likelihood is maximized may be received by the CPU 202 of the electronic device 102. At step 322, a frame counter may be started by the CPU 202 for keeping a count of the number of frames to be analyzed based on the Discrete Wavelet Transform (DWT) and Singular Value Decomposition (SVD) analysis.

At step 324, the received frames corresponding to the captured image may be divided into a top portion and bottom portion. Such a splitting operation is performed to reduce the computational complexity of the system. Further, the splitting of the frames into the top portion and the bottom portion is based on execution of one or more instructions of the splitting module 206a, by the CPU 202. In an aspect, the top portion may be processed based on a discrete wavelet transform (DWT) and the bottom portion may be processed based on a singular value decomposition (SVD). This is because the top portion mostly contains changing background (such as the sky) and DWT is ideally suited differentiating between changing background and a contaminant. On the other hand, the bottom portion is processed based on SVD as the bottom portion mostly contains constant background (such as a road), and SVD is suited for differentiating between constant backgrounds a contaminant.

In an example embodiment, the ratio of division of the frames may correspond to a ratio, such as "30:70" between the top portion and the bottom portion. In an example embodiment, such a splitting of the frame may not be desired when the imaging device 104 is facing the ground. In such an embodiment, only SVD may be performed by the CPU 202.

At step 326, it may be determined whether the top portion of the frame is being analyzed. In instances, when the top portion is being analyzed the control passes to step 326a. In instances, when the bottom portion is being analyzed the control passes to step 326b.

Figure 5:
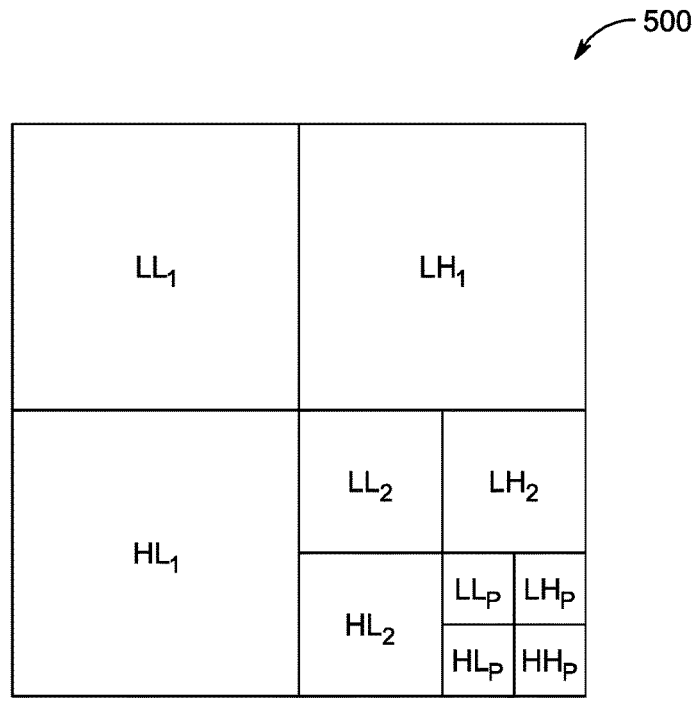
FIG. 5 illustrates an exemplary division of a patch corresponding to the top portion of an input image into a plurality of levels, in accordance with an embodiment.

At step 326a, the processing based on DWT may comprise dividing the top portion of the patch into a plurality of levels. Such a division into the plurality of levels corresponding to sub-bands is depicted in FIG. 5. In an example embodiment, an exemplary top portion of a patch 500 may be divided into "p" levels. For illustrative purposes, the top portion has been divided into "3" levels in FIG. 5. The division of the top portion of the patch 500 is performed such that maximum low frequency components are retained for lower indexed sub-bands, such as "$LL_1$", "$LH_1$", and "$HL_1$". Further, the high frequency components are concentrated in the higher indexed sub-bands, such as "$LH_3$", "$HL_3$", and "$HH_3$".

At step 328a, log energy metric, "$P_{XY_p}$" may be calculated by the CPU 202, based on execution of one or more instructions of the DWT module 206e. The log energy metric is calculated in accordance with the equation (7):

$$P_{XY_p} = \log_{10}\left(\varepsilon_r + \frac{1}{N_p} \sum D_{XY_p}^2(i, j)\right) \quad (7)$$

where, "$\varepsilon_r$" corresponds to a constant value added to the equation in order to avoid a "log 0" scenario, "$N_p$" corresponds to the number of DWT coefficients in "p" levels and patches having indexes that correspond to the conditions "i≤M" and "j≤N", "$D_{XY_p}$" is in accordance with the condition "$D_{XY_p} \in (D_{LL_p}, D_{LH_p}, D_{HL_p})$", "$P_{XY_p}$" is in accordance with the condition "$P_{XY_p} \in (P_{LL_p}, P_{LH_p}, P_{HL_p})$" and "LL", "LH", and "HL" correspond to sub-bands at various levels. Further, the log energy metric is not calculated for "$HH_p$" as "$HH_p$" comprises high frequency components.

Further, a total log energy metric, "$P_p$" may be determined by the CPU 202 based on the log energy calculated for the various sub-bands. The total log energy is calculated in accordance with the equation (8):

$$P_p = \beta P_{LL_p} + (1 - \beta)\left(\frac{P_{LH_p} + P_{HL_p}}{2}\right) \quad (8)$$

where, "β" corresponds to an empirically determined constant value that may be stored in the memory 204. Further, "β" may be determined by the CPU 202 in such a way that maximum log energy is contributed to the low frequency components.

At step 330a, for each patch, wavelet energy metric, "$PB_{DWT}$" may be determined by the CPU 202 based on the execution of one or more instructions of the DWT module 206e. The calculation of the wavelet energy metric is in accordance with the equation (9):

$$PB_{DWT} = \sum_{m=1}^{p} 2^{p-m} P_{p_m} \quad (9)$$

where, "p" corresponds to the number of levels in which the top portion of the patch is divided, and "m" corresponds to an index of a level. At step 332a, it may be determined whether the calculated wavelet energy metric for each patch is less than threshold log energy. In instances, when the calculated wavelet energy metric for each patch is less than the threshold log energy, the control passes to step 334a. In instances, when the calculated wavelet energy metric for each patch is not less than the threshold log energy, the patch is discarded at step 344.

At step 334a, one or more patches in the spatial neighborhood of the analyzed patch are determined. In an example embodiment, the number of the one or more patches in the spatial neighborhood of the analyzed patch may correspond to a value, such as "8". At step 336a, wavelet based log energy may be calculated for each of the determined patches in the spatial neighborhood of the analyzed patch. At step 338a, it may be determined whether the wavelet based log energy of each of the determined patches in the spatial neighborhood of the analyzed patch is less than the log energy threshold. In instances, when the log energy of each of the determined patches in the spatial neighborhood of the analyzed patch is less than the log energy threshold, the control passes to the step 340a. In instances, when the log energy of each of the determined patches in the spatial neighborhood of the analyzed patch is not less than the log energy threshold, the patches are discarded at step 344.

At step 340a, the patches selected from the step 332a and 338a are accumulated. At step 342a, it may be determined whether the count of the selected patches is less than a second count of patches. In an example embodiment, the value of the second count of pixels may be denoted by "s" that may have a value "10". In instances, when the count of the selected patches is less than a second count of patches, the control passes to the step 320. In instances, when the count of the selected patches is not less than the second count of patches, the control passes to the step 346.

At step 326b, singular values of the bottom portion of the one or more patches corresponding to the received frames may be determined by the CPU 202. The determination of the singular value is performed based on execution of one or more instructions of the SVD module 206f. The singular value for an image patch "$I_p$" may be determined in accordance with the equation (10):

$$I_p = \sum_{k=1}^{d} \lambda_k u_k v_k^T \qquad (10)$$

where, "d" corresponds to total number of weights, "$\lambda_k$", "u", and "$v_k$" correspond to column vectors of orthogonal matrices "U", "V" and diagonal matrix "$\Lambda$", respectively. The column vectors are determined in accordance with the equation (11):

$$I = U\Lambda V^T \qquad (11)$$

The CPU 202 may be configured to perform singular value decomposition to decompose the patch into weighted sum of Eigen image patches. Such weights, such as "$\lambda_k$" correspond to singular values of the patch. In an aspect, the sum of the first few singular values that correspond to a coarse representation of the image is higher for blurred patches compared to the non-blurred patches.

At step 328b, singular value decomposition metric may be determined for each patch of the received image frames by the CPU 202. The determination of the singular value decomposition metric is based on the execution one or more instructions of the SVD module 206f. Further, the singular value decomposition metric "$PB_{SVD}$" is determined in accordance with the equation (12):

$$PB_{SVD} = \begin{cases} \dfrac{\sum_{v=1}^{0.4*d} \lambda_v}{\sum_{k=1}^{d} \lambda_k} \sum_{v=1}^{0.4*d} \lambda_v \neq \sum_{k=1}^{d} \lambda_k \\ 0 \qquad \text{elsewhere} \end{cases} \qquad (12)$$

where, "d" corresponds to the total number of weights obtained. At step 330b, it may be determined whether the calculated singular value decomposition metric for each patch is less than threshold singular value decomposition metric. In instances, when the calculated singular value decomposition metric for each patch is greater than the threshold singular value decomposition metric, the control passes to step 332b. In instances, when the calculated wavelet energy metric for each patch is not greater than the threshold log energy, the patch is discarded at step 344.

At step 332b, one or more patches in the spatial neighborhood of the analyzed patch are determined. In an example embodiment, the number of the one or more patches in the spatial neighborhood of the analyzed patch may correspond to a value, such as "8". At step 334b, singular value decomposition metric may be calculated for each of the determined patches in the spatial neighborhood of the analyzed patch. At step 336b, it may be determined whether the singular value decomposition metric of each of the determined patches in the spatial neighborhood of the analyzed patch is greater than the singular value decomposition metric threshold. In instances, when the singular value decomposition metric of each of the determined patches in the spatial neighborhood of the analyzed patch is greater than the singular value decomposition metric threshold, the control passes to the step 338b. In instances, when the log energy of each of the determined patches in the spatial neighborhood of the analyzed patch is not greater than the singular value decomposition metric threshold, the patches are discarded at step 344.

At step 338b, the patches selected from the step 330b and 336b are accumulated. At step 340b, it may be determined whether the count of the selected patches is less than the second count of patches. In an example embodiment, the value of the second count of pixels may be denoted by "s" that may have a value "10". In instances, when the count of the selected patches is less than a second count of patches, the control passes to the step 320. In instances, when the count of the selected patches is not less than the second count of patches, the control passes to the step 346.

At step 346, the analyzed top portion and the bottom portion of the one or more patches (the accumulated patches based on the DWT and SVD analyses) corresponding to the received frames are merged based on the determined wavelet energy metric "$PB_{DWT}$" and the determined singular value decomposition metric "$PB_{SVD}$". At step 348, second maximum likelihood corresponding to the merged top portion and the bottom portion may be determined by the CPU 202. The second maximum likelihood may be determined based on the execution of one or more instructions of the maximum likelihood calculation module 206d, in accordance with the equation (6). At step 350, the patch indices of one or more patches for which the determined second maximum likelihood is greater than a second predefined threshold are stored in the memory 204, by the CPU 202.

Figure 6:
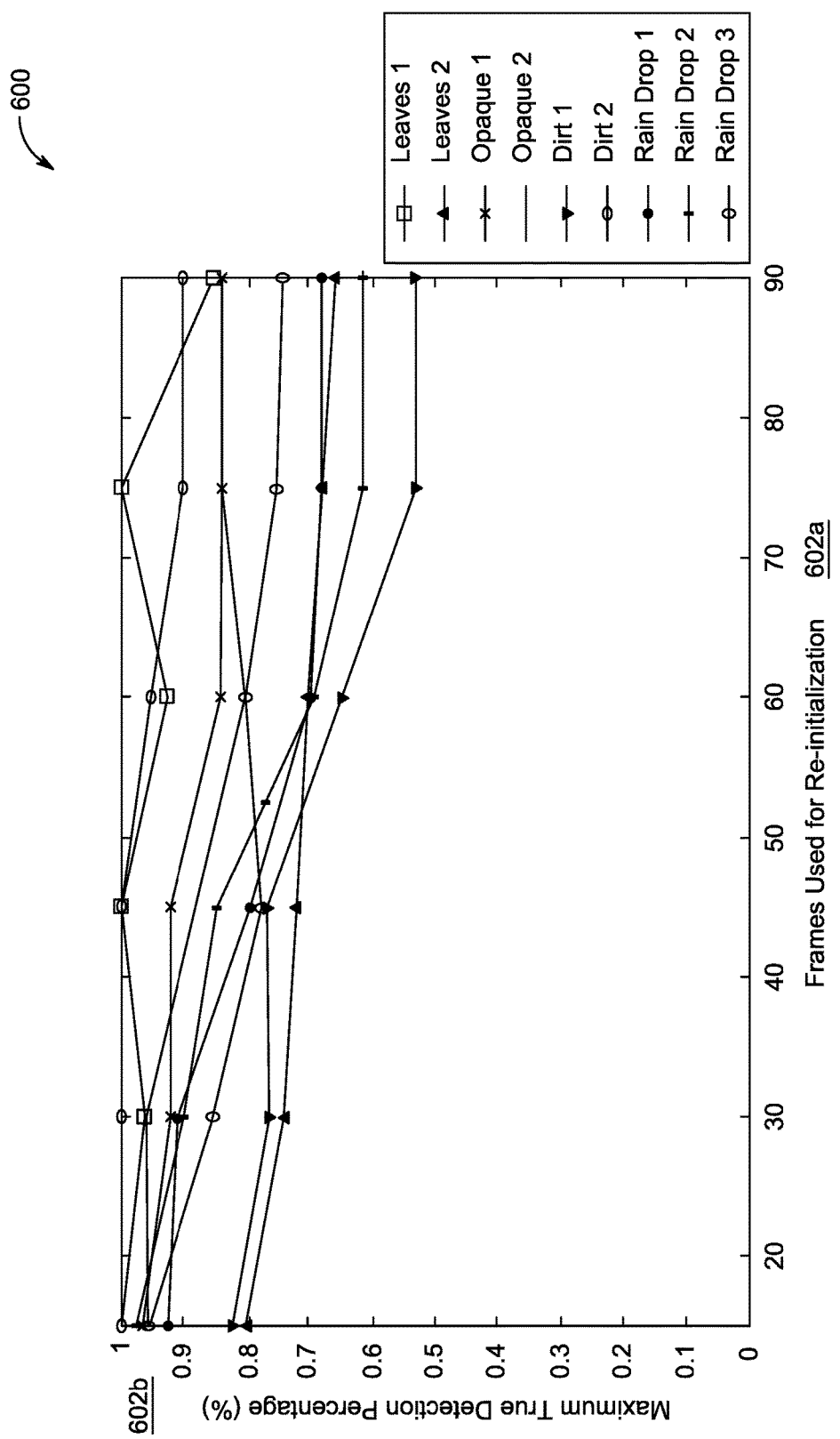
FIG. 6 illustrates a graph for temporal consistency analysis for detection of contaminants present on a lens of an imaging device, in accordance with an embodiment.

At step 352, the presence of a contaminant in the frames may be ascertained based on a temporal consistency performed by the CPU 202. Such a temporal consistency is depicted in FIG. 6 via a graphical analysis in which a graph 600 is plotted between the number of frames required for re-initialization of the process for detection of a contaminant 602a along x-axis and the number of maximum true detection 602b along y-axis. The CPU 202 may further analyze the plotted graph 600 to classify a contaminant. In an aspect, the graph 600 is analysed based on the temporal consistency feature along with image statistics, such as mean and standard deviation. In an aspect, the temporal consistency feature analysis may comprise determining a number of frames for which the one or more image features are consistent over a predefined number of frames on which the analysis is applied. In an example embodiment, the one or more image features may correspond to a saturation index, a variance of the one or more patches of the image, and/or singular value decomposition metric. A person of ordinary skill in the art will appreciate that the one or more image features may include image features in addition to the aforementioned features, without limiting the scope of the disclosure. Furthermore, the individual curves depicted in the graph 600 may correspond to different videos having different types of contaminants.

In an aspect, based on the temporal consistency feature analysis, the CPU 202 may be further configured to classify the contaminant into one of a predefined category. In an example embodiment, the predefined category may correspond to transparent contaminant, an opaque contaminant, and/or a translucent contaminant. Further, in an aspect, the predefined number of frames corresponding to the opaque contaminant is greater than the predefined number of frames corresponding to the translucent contaminant, and the predefined number of frames corresponding to the translucent contaminant is greater than the predefined number of frames corresponding to the transparent contaminant.

In an example embodiment, the type of contaminants may include, but are not limited to, leaves, rain drops, and/or dirt. Based on the analysis the results for detection of the contaminants may be tabulated to classify the contaminant into the aforementioned types. Based on the tabulation the CPU 202 may be configured to classify the contaminant as a leaf, rain, or dirt when the number of frames required for analysis is a value, such as "30 frames", "45 frames", and/or "75 frames". A person of ordinary skill in the art will appreciate that the type of contaminants may correspond to one or more other contaminants apart from the aforementioned types of contaminants, without limiting the scope of the disclosure. In an example, embodiment, the CPU 202

In an example embodiment, based on the successful detection and classification of contaminants based on the aforementioned temporal analysis and one or more image features, a bounding box may be around the detected contaminant by the CPU 202. Further, such a bounding box and the detected contaminant may be presented to a user using an exemplary display associated with the electronic device 102. In another example embodiment, the information corresponding to the detected contaminant may be appended to the bounding box, in order to convey the classification information to the user. The control passes to end step 354.

Figure 4:
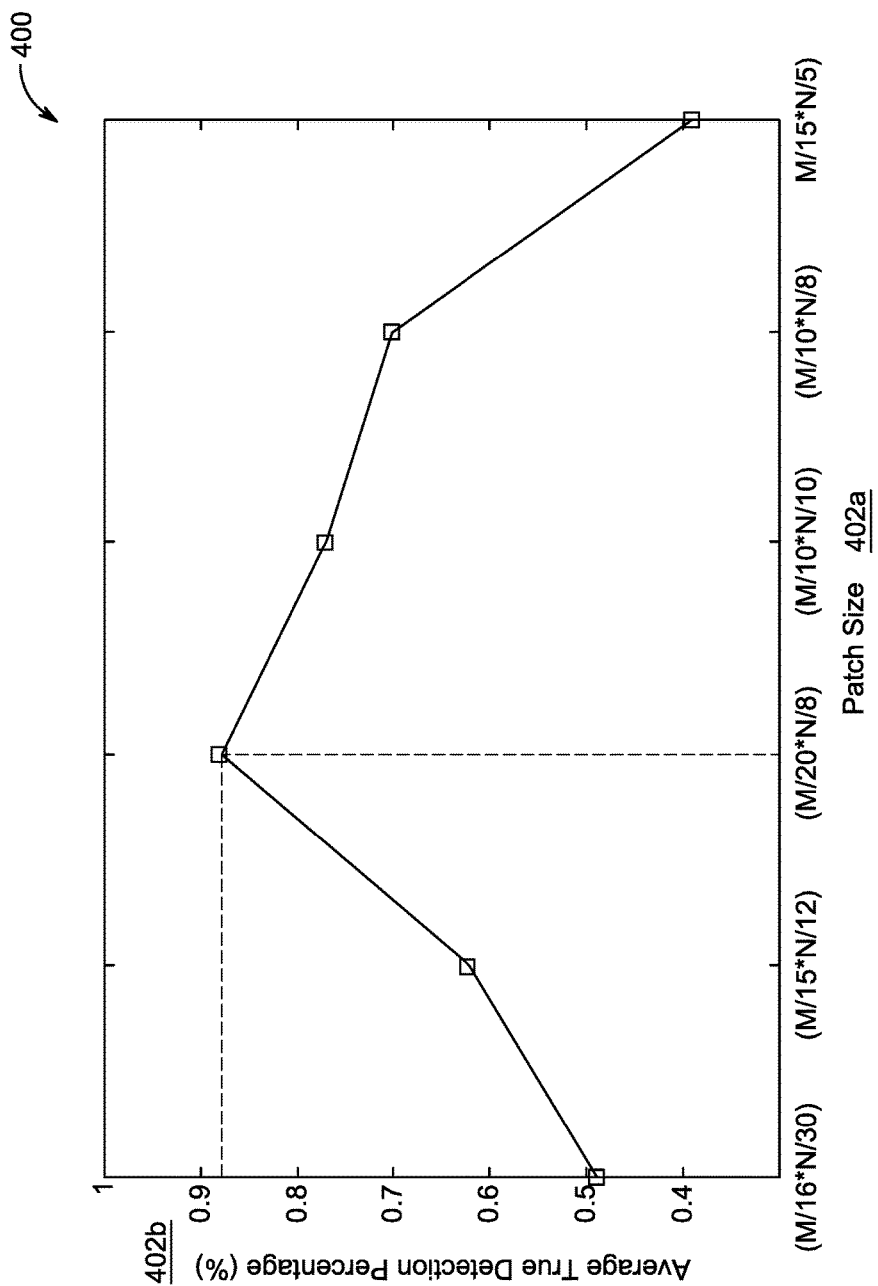
FIG. 4 illustrates a graphical depiction of the true detection analysis, for detection of contaminants present on a lens of an imaging device, in accordance with an embodiment.

FIG. 4 illustrates a graphical depiction of the true detection analysis, for detection of contaminants present on a lens of an imaging device, in accordance with an embodiment. With reference to FIG. 4 there is shown a graph 400 that is may be plotted between the size of the patch 402a, and the average true detection percentage 402b. Based on the plotting of the graph, a curve 404 may be obtained depicting the variation of the average true detection percentage with the size of the patch. Further, based on the graph, an optimum size of the patch into which the one or more frames are split is determined, as explained in FIG. 3.

FIG. 5 illustrates an exemplary division of a patch corresponding to the top portion of an input image into a plurality of levels, in accordance with an embodiment. With reference to FIG. 5, there is shown an exemplary top portion of a patch 500 that may be divided into various levels. Further, the details of division of the top portion of the patch 500 are explained in FIG. 3.

FIG. 6 illustrates a graph for temporal consistency analysis for detection of contaminants present on a lens of an imaging device, in accordance with an embodiment. With reference to FIG. 6, there is shown a graph 600 plotted between the number of frames required for re-initialization of the process for detection of a contaminant 602a and the number of maximum true detection 602b. Based on the plotted graph 600, the detected contaminant may be categorized into one or more predefined categories, as explained in detail in FIG. 3.

In an example embodiment, a non-transient computer readable memory storing one or more instructions for causing one or more processors for detecting contaminants present on a lens of an imaging device. The one or more processors upon executing the instructions is configured for splitting an input image received from the imaging device into a plurality of patches of a predefined size; calculating a kurtosis value for each of the plurality of patches; determining a kurtosis based threshold value for the input image, the determined kurtosis based threshold value is a median of the kurtosis values calculated for each of the plurality of patches; selecting one or more patches of the input image having corresponding kurtosis value less than the kurtosis based threshold value based on patch indices associated with each of the one or more patches; determining a first maximum likelihood for each of the one or more selected patches, the first maximum likelihood is based on a maximum likelihood criterion; storing the patch indices corresponding to the selected one or more patches for which the determined first maximum likelihood is greater than a first predefined threshold, the determined first maximum likelihood is based on the kurtosis values of the selected one or more patches; splitting the one or more selected patches having the first maximum likelihood greater than the first predefined threshold in a top portion and a bottom portion, the top portion is processed based on a discrete wavelet transform and the bottom portion is processed based on a singular value decomposition; determining a wavelet energy metric based on a cumulative log energy associated with sub-bands of the top portion of the plurality of patches; determining a singular value decomposition metric based on a sum of singular values corresponding to the bottom portion of the plurality of patches; merging the top portion and the bottom portion based on the determined wavelet energy metric and the determined singular value decomposition metric; determining the second maximum likelihood corresponding to the top portion and the bottom portion; storing the one or more patches for which the determined second maximum likelihood is greater than second predefined threshold, the determined second maximum likelihood corresponds to the merged top portion and the bottom portion; and classifying a contaminant into one or more predefined categories based on one or more image features.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for detection of contaminants present on a lens of an imaging device, said method comprising:
    splitting an input image received from the imaging device into a plurality of patches of a predefined size;
    calculating a kurtosis value for each of the plurality of patches;
    determining a kurtosis based threshold value for the input image, the determined kurtosis based threshold value is a median of the kurtosis values calculated for each of the plurality of patches;
    selecting one or more patches of the input image having corresponding kurtosis value less than the kurtosis based threshold value based on patch indices associated with each of the one or more patches;
    determining a first maximum likelihood for each of the one or more selected patches, the first maximum likelihood is based on a maximum likelihood criterion;
    storing the patch indices corresponding to the selected one or more patches for which the determined first maximum likelihood is greater than a first predefined threshold;
    splitting the one or more selected patches having the first maximum likelihood greater than the first predefined threshold in a top portion and a bottom portion, the top portion is processed based on a discrete wavelet transform and the bottom portion is processed based on a singular value decomposition;
    determining a wavelet energy metric based on a cumulative log energy associated with sub-bands of the top portion of the plurality of patches;
    determining a singular value decomposition metric based on a sum of singular values corresponding to the bottom portion of the plurality of patches;
    merging the top portion and the bottom portion based on the determined wavelet energy metric and the determined singular value decomposition metric;
    determining a second maximum likelihood corresponding to the top portion and the bottom portion;
    storing the one or more patches for which the determined second maximum likelihood is greater than second predefined threshold, the determined second maximum likelihood corresponds to the merged top portion and the bottom portion; and
    classifying a contaminant into one or more predefined categories based on one or more image features.

2. The method of claim 1, wherein the splitting of the input image into the plurality of patches is based on a true detection analysis that is based on a correlation between the number of patches into which the input image is divided and the number of true detections based the number of patches into which the input image is divided.

3. The method of claim 1, wherein the first predefined threshold is a product of a first number of frames of an input feed and a likelihood factor.

4. The method of claim 1, wherein the determined second maximum likelihood is based on the maximum likelihood criterion.

5. The method of claim 4, wherein the maximum likelihood criterion is based on a total number of analyzed frames of an input feed, an outlier rejection function, a consistency value, and a likelihood factor.

6. The method of claim 4, wherein the second predefined threshold is a product of a second number of frames of an input feed and a likelihood factor.

7. The method of claim 1, wherein the cumulative of singular values are determined based on a set of column vectors associated with a plurality of orthogonal matrices and a diagonal matrix, and a total number of weights.

8. The method of claim 7, wherein the plurality of orthogonal matrices and the diagonal matrix is determined based on a singular value decomposition process performed on the bottom portion of the plurality of patches.

9. The method of claim 1, wherein a temporal consistency feature analysis is performed on the stored one or more patches comprising merged top portion and the bottom portion.

10. The method of claim 1, wherein the consistency feature analysis comprises determining at least a number of frames of an input feed for which the one or more image features are consistent over a predefined number of frames of the input feed on which the consistency feature analysis.

11. The method of claim 10, wherein the one or more image features correspond to at least a saturation index, a variance of the one or more patches of the image, a singular value decomposition metric, and/or a wavelet energy metric.

12. The method of claim 10, wherein the predefined categories correspond to at least a transparent contaminant, an opaque contaminant, and/or a translucent contaminant.

13. The method of claim 12, wherein the predefined number of frames corresponding to the opaque contaminant is greater than the predefined number of frames corresponding to the translucent contaminant, and the predefined number of frames corresponding to the translucent contaminant is greater than the predefined number of frames corresponding to the transparent contaminant.

14. The method of claim 1, further comprising pre-processing the input image by enhancing the contrast for detecting the contaminants in low light conditions.

15. The method of claim 1, wherein further comprising performing corrections to compensate camera jitter and/or camera motion.

16. The method of claim 1, wherein the lens of the imaging device corresponds to a fish-eye lens, a wide lens, or an ultra-wide lens.

17. A system for detection of contaminants present on a lens of an imaging device, said system comprising one or more processors and a memory associated with the one or more processors, the one or more processors configured to:
split an input image received from the imaging device into a plurality of patches of a predefined size;
calculate a kurtosis value for each of the plurality of patches;
determine a kurtosis based threshold value for the input image, the determined kurtosis based threshold value is a median of the kurtosis values calculated for each of the plurality of patches;
select one or more patches of the input image having corresponding kurtosis value less than the kurtosis based threshold value based on patch indices associated with each of the one or more patches;
determining a first maximum likelihood for each of the one or more selected patches, the first maximum likelihood is based on a maximum likelihood criterion;
store patch indices corresponding to the selected one or more patches for which the determined first maximum likelihood is greater than a first predefined threshold, the determined first maximum likelihood is based on the kurtosis values of the selected one or more patches;
split the one or more selected patches having the first maximum likelihood greater than the first predefined threshold in a top portion and a bottom portion, the top portion is processed based on a discrete wavelet transform and the bottom portion is processed based on a singular value decomposition;
determine a wavelet energy metric based on a cumulative log energy associated with sub-bands of the top portion of the plurality of patches;
determine a singular value decomposition metric based on a sum of singular values corresponding to the bottom portion of the plurality of patches;
merge the top portion and the bottom portion based on the determined wavelet energy metric and the determined singular value decomposition metric;
determine a second maximum likelihood corresponding to the merged top portion and the bottom portion;
store the one or more patches for which the determined second maximum likelihood is greater than second predefined threshold, the determined second maximum likelihood corresponds to the top portion and the bottom portion;
perform a temporal consistency feature analysis on the stored one or more patches; and classify a contaminant into one or more predefined categories based on the performed temporal consistency feature analysis and one or more image features.

18. The system of claim 17, wherein the one or more processors are configured to pre-process the input image based on a contrast enhancement module to detect the contaminants in low light conditions.

19. The system of claim 17, wherein the one or more processors are configured to corrections for compensating camera jitter and/or camera motion.

20. A non-transitory computer-readable medium, including instructions stored thereon which, when read and executed by one or more computers, causes the one or more computers to perform the method comprising the steps of:
splitting an input image received from the imaging device into a plurality of patches of a predefined size;
calculating a kurtosis value for each of the plurality of patches;
determining a kurtosis based threshold value for the input image, the determined kurtosis based threshold value is a median of the kurtosis values calculated for each of the plurality of patches;
selecting one or more patches of the input image having corresponding kurtosis value less than the kurtosis based threshold value based on patch indices associated with each of the one or more patches;
determining a first maximum likelihood for each of the one or more selected patches, the first maximum likelihood is based on a maximum likelihood criterion;
storing the patch indices corresponding to the selected one or more patches for which the determined first maximum likelihood is greater than a first predefined threshold, the determined first maximum likelihood is based on the kurtosis values of the selected one or more patches;
splitting the one or more selected patches having the first maximum likelihood greater than the first predefined threshold in a top portion and a bottom portion, the top portion is processed based on a discrete wavelet transform and the bottom portion is processed based on a singular value decomposition;
determining a wavelet energy metric based on a cumulative log energy associated with sub-bands of the top portion of the plurality of patches;
determining a singular value decomposition metric based on a sum of singular values corresponding to the bottom portion of the plurality of patches;
merging the top portion and the bottom portion based on the determined wavelet energy metric and the determined singular value decomposition metric;
determining a second maximum likelihood corresponding to the merged top portion and the bottom portion;
storing the one or more patches for which the determined second maximum likelihood is greater than second predefined threshold, the determined second maximum likelihood corresponds to the top portion and the bottom portion; and
classifying a contaminant into one or more predefined categories based on one or more image features.

* * * * *